(12) United States Patent
Menzel

(10) Patent No.: US 8,673,062 B2
(45) Date of Patent: Mar. 18, 2014

(54) METHOD FOR PURIFYING GASES AND OBTAINING ACID GASES

(75) Inventor: Johannes Menzel, Waltrop (DE)

(73) Assignee: UHDE GmbH, Dortmund (DE)

( * ) Notice: Subject to any disclaimer, the term of this patent is extended or adjusted under 35 U.S.C. 154(b) by 210 days.

(21) Appl. No.: 13/132,193

(22) PCT Filed: Nov. 4, 2009

(86) PCT No.: PCT/EP2009/007895
§ 371 (c)(1),
(2), (4) Date: Jun. 24, 2011

(87) PCT Pub. No.: WO2010/069431
PCT Pub. Date: Jun. 24, 2010

(65) Prior Publication Data
US 2012/0160101 A1    Jun. 28, 2012

(30) Foreign Application Priority Data

Dec. 17, 2008   (DE) .......................... 10 2008 062 387

(51) Int. Cl.
*B01D 53/14*   (2006.01)
(52) U.S. Cl.
USPC .................. 95/165; 95/166; 95/168; 95/179; 95/183; 95/191; 95/193; 95/207; 95/209; 95/227; 95/236
(58) Field of Classification Search
USPC ........... 95/235, 236, 159, 161, 167, 168, 169, 95/183, 191, 207
See application file for complete search history.

(56) References Cited

U.S. PATENT DOCUMENTS

| 4,345,918 | A | * | 8/1982 | Meissner ........................ 95/179 |
| 4,522,638 | A |   | 6/1985 | Karwat |
| 4,899,544 | A | * | 2/1990 | Boyd .............................. 60/618 |
| 5,240,476 | A | * | 8/1993 | Hegarty .......................... 95/161 |
| 6,139,605 | A | * | 10/2000 | Carnell et al. .................. 95/164 |
| 7,674,321 | B2 |   | 3/2010 | Menzel |
| 8,287,626 | B2 | * | 10/2012 | Hoang-Dinh et al. .......... 95/174 |
| 2002/0104368 | A1 | * | 8/2002 | Bryselbout .................... 73/23.2 |

FOREIGN PATENT DOCUMENTS

WO    WO2008107550    * 12/2008  ............. B01D 53/14

* cited by examiner

*Primary Examiner* — Duane Smith
*Assistant Examiner* — Cabrena Holecek
(74) *Attorney, Agent, or Firm* — Jonathan Myers; Andrew Wilford

(57) ABSTRACT

A method of removing acid gases from raw gas is disclosed in which the raw gas is supplied to an absorption column where it is contacted with a physical absorption agent, having a boiling point lower than 100° C. at atmospheric pressure, under elevated operating pressure to load, the physical absorption agent with acid gases and usable gases and then the physical absorption agent loaded with acid gases and usable gases is driven from the absorption column at its sump while drawing off at the head of the absorption column a purified top gas containing up to a few ppm of acid-gas components. Following the absorption, the physical absorption agent undergoes stripping to remove usable gases, and regeneration to remove the acid gases as well as to provide a regenerated physical absorbent which may be used to treat additional raw gas.

16 Claims, 1 Drawing Sheet

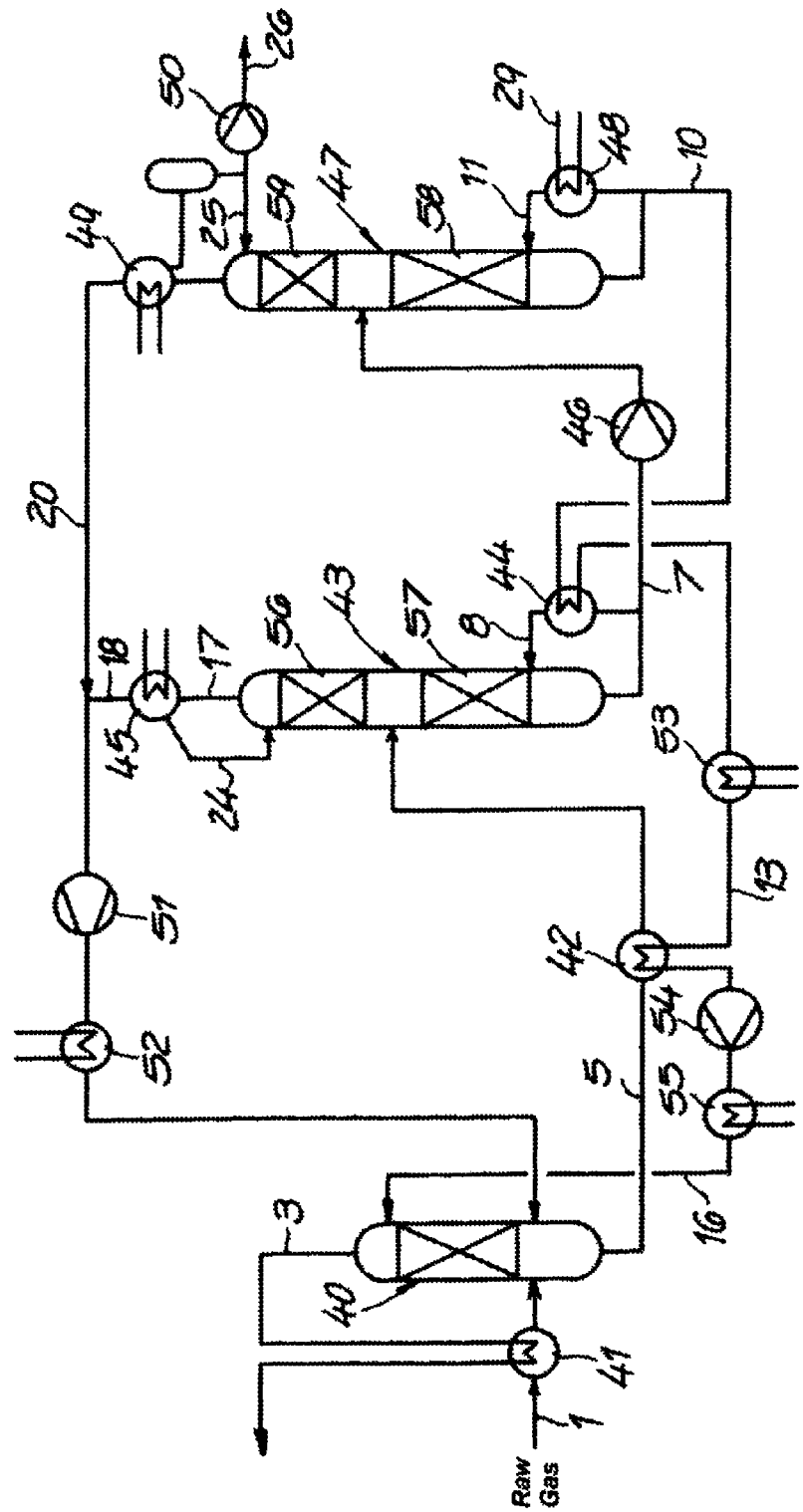

US 8,673,062 B2

METHOD FOR PURIFYING GASES AND OBTAINING ACID GASES

CROSS REFERENCE TO RELATED APPLICATIONS

This application is the US-national stage of PCT application PCT/EP2009/007895 filed 4 Nov. 2009, published 24 Jun. 2010 as WO2010/069431, and claiming the priority of German patent application 102008062387.3 itself filed 17 Dec. 2008, whose entire disclosures are herewith incorporated by reference.

FIELD OF THE INVENTION

The invention relates to a method of removing acid gases from raw gases, in which the raw gas is fed into an absorption column where it is contacted with an absorption agent under elevated operating pressure, the loaded absorption agent leaving the absorption column at the sump. Such a method is known, for example, from WO 2004/105919 [U.S. Pat. No. 7,674,321].

BACKGROUND OF THE INVENTION

Raw gases such as, for example, natural gas or synthetic gas also contain, in addition to useful components, contamination such as, for example, hydrogen sulfide, carbon dioxide or organic sulfur components. Organic sulfur contaminations are primarily mercaptan and carbon oxysulfide. For use, these contaminations must be removed from the raw gases. For example, sulfur in the form of hydrogen sulfide or carbon oxysulfide is a poison for many catalysts, blocking their effectiveness. Statutory provisions also mandate lowering sulfur emission. Because of global warming, a reduction of carbon dioxide emission is also required, as its presence in natural gas also lowers heating value. For purifying raw gas of the components cited above that are described in the following as acid gases, a number of technical methods are available in which the gas is purified with an absorption agent. For removing acid gases, either chemical absorption agents or physical absorption agents can be used.

The requirements regarding degree of purity depend on the further use of the top gas and on the type of acid gas. In the case of sulfur components it is usually necessary that they be removed from the raw gas for its further technical use down to a contents in ppm. In the case of carbon dioxide, depending on the further use of the top gas, the carbon dioxide is either removed entirely, or partially, or also only as little as possible.

When removing sulfur components, the acid gas separated in the absorption agent regeneration is customarily processed further in a Claus plant into sulfur. This entails additional investment costs for the Claus plant. Because of the worldwide oversupply, no appreciable revenue can be obtained for the sulfur that is being created, so that it is difficult to amortize these investments. As an alternative to obtaining elemental sulfur, storing acid gases in gas caverns is being considered more frequently. This way, the acid gases are compressed by expensive compressors so very much that it is possible to transport the acid gases to the underground gas storage site that is provided for it, for example, an exploited natural gas field. It is therefore particularly advantageous for this purpose when the acid gases that accumulate during regeneration are present at a pressure that is as high as possible, because thereby, significant investment and operating expenses for acid-gas compression are saved. It is also advantageous for sequestering carbon dioxide if the removed carbon dioxide is recovered at as high a regeneration pressure as possible.

In the case of chemical absorption agents, the regeneration pressure at which the acid gases accumulate can only be raised marginally, as otherwise an accelerated decomposition of the chemical absorption agent would occur, because an increase in the regeneration pressure causes an increase in the boiling temperature.

In principle, in the case of physical absorption agents it is possible to obtain some of the acid gases at a higher pressure. For this, the regeneration is performed by lowering the pressure with the aid of several sequentially switched flash levels. The acid gases released at the flash levels are thereby brought to a compression level that corresponds to the corresponding pressure level of the respective flash level. Although the consumption of energy for the recompression of the acid gases can be lowered by using this approach, most of the acid gas must still be compressed from an atmospheric pressure level to the end storage pressure. Further, regeneration by lowering the pressure using flash levels makes only a limited removal of the acid-gas components possible, as a certain residual level of acid gases always remains in the absorption agent when using flash generation.

This means that the required purity of the top gas is not attained. For example, removing hydrogen sulfide according to specifications requires a purity of the top gas to a level of just a few ppms of acid-gas components. Physical absorption agents also have the disadvantage that they do not work as selectively with respect to the resource components as chemical absorption agents. In addition to the acid gases, significant amounts of usable gases are also absorbed. These usable gases are, for example, hydrogen and carbon monoxide in the production of synthetic gas, or methane in the purification of natural gas.

OBJECT OF THE INVENTION

It is the object of the present invention to provide a method in which the removed acid gases accumulate at high regeneration pressure, the raw gas is purified up to a few ppm of acid-gas components and coabsorbed usable gases are separated from the acid gases prior to the regeneration of the absorption agents

SUMMARY OF THE INVENTION

According to the invention, the object is attained in that the loaded absorption agent is conveyed to a high-pressure stripping column in which stripping steam is generated by the evaporation of some of the absorption agent, the coabsorbed useable gases being driven out by the stripping steam and drawn off at the head of the high stripping column, the absorption agent also contained in the head steam being liquefied and recycled into the high-pressure stripping column, and the absorption agent leaving the sump that is still loaded with acid gases is fed to a high-pressure regeneration column in which the acid gases are separated and are drawn off under high pressure at the head of the high-pressure regeneration column, and the regenerated absorption agent is drawn off at the sump of the high-pressure regeneration column and recycled to the absorption column.

Preferably, a physical absorption agent with a low boiling point is used. Methanol has shown to be particularly favorable. Methanol can be evaporated even at high pressure without exceeding a boiling temperature limit that is above that at which decomposition of the absorption agent occurs. Methanol has the additional advantage that at high acid-gas partial pressures, a higher load of sulfur components can be achieved than with chemical absorption agents.

It has been shown to be particularly advantageous when an absorption agent is used that has a boiling point lower than 100° C. at atmospheric pressure, preferably lower than 65° C.

Preferably, the absorption column is operated at a pressure of 5 to 150 bar. When using methanol as absorption agent, some of the usable gases contained in the raw gas are coabsorbed in addition to the acid gases. The loaded absorption agent is drawn off at the sump of the absorption column and conveyed to the high-pressure stripping column according to the invention.

It has been shown to be particularly favorable from an energy point of view when the loaded absorption agent that leaves the absorption column at the sump is preheated in a heat exchanger containing the hot regenerated solution that is drawn off at the sump of the high-pressure regeneration column. It has been shown to be advantageous when the loaded absorption agent that leaves the absorption column at the sump is subject to a temperature increase of 50 to 250° C. before it is supplied to the high-pressure stripping column.

In the high-pressure stripping column, some of the absorption agent is evaporated by the external heat supply. This preferably occurs with a boiler in the sump of the high-pressure stripping column. The evaporation of the absorption agent generates a flow of stripping steam. In the high-pressure stripping column, the usable gases are driven out and drawn off at the head of the high-pressure stripping column. The absorption agent contained in the head steam is liquefied with a condenser and recycled into the high-pressure stripping column. The uncondensed gas is returned into the absorption column.

In a further embodiment of the invention, an external stripping medium is fed to the sump of the high-pressure stripping column such as, for example, nitrogen or carbon dioxide. As a result, the amount of stripping steam generated by the evaporation of the absorption agent can be lowered.

The high-pressure stripping column is preferably operated at a pressure of 5 to 150 bar. Preferably, the operating pressure of the high-pressure stripping column is above the operating pressure of the absorption column. This way, the uncondensed gas that accumulates subsequent to the condenser can be transported back to the absorption column by the drop in pressure that is present. In the event the pressure level is not sufficient for recirculation, the gas is recycled to the absorption column by a compressor.

The quality of the separation of usable gas is influenced by the heating performance of the boiler, the cooling performance of the condenser, and by the type and number of mass transfer elements in the high-pressure stripping column. Thus, the proportion of usable gases is minimized in the absorption agent that is drawn off at the sump of the high-pressure stripping column. Furthermore, the head temperature of the high-pressure stripping column is adjusted in such a way that in the condenser, condensation is possible with easily available cooling agents such as, for example, cold water or cold air. The head temperature of the high-pressure stripping column is also influenced by the acid gases contained in the head product. The pressure at which the high-pressure stripping column is operated also influences the condensation of the head steams. Preferably, the pressure is selected in such a way that the head steams can be condensed using easily available cooling media such as cold water or cold air.

The absorption agent leaving the sump of the high-pressure stripping column that is still loaded with acid gases is fed to a high-pressure regeneration column. If required, a pump is used for transport.

In conventional methods for purifying raw gas, the regeneration column is operated at low pressure. Most often, the pressure is only 0.1 bar to 1 bar. In contrast, in the method according to the invention, the regeneration of the absorption agent occurs under high pressure. The high-pressure regeneration column preferably operates at an operating pressure of 5 to 100 bar.

Preferably, stripping steam in which a part of the absorption agent is evaporated is generated at the sump of the high-pressure regeneration column. The acid gases are separated in the high-pressure regeneration column and drawn off at the head of the high-pressure regeneration column under high pressure. The recirculating amount of the head product condensed in the condenser of the high-pressure regeneration column and the type and number of the mass exchange elements used in the high-pressure regeneration column effect an almost complete separation of acid gases and absorption agent. The acid gases drawn off at the head of the column are transported to the storage site with the aid of a transport unit.

In a further embodiment of the invention, the sump of the high-pressure regeneration column is supplied an external stripping medium such as, for example, nitrogen or carbon dioxide, as a result of which the amount of required indirectly generated stripping steam can be reduced.

In a particularly favorable embodiment of the invention, at least one part of the acid-gas fraction at the head of the high-pressure regeneration column accumulates as a fluid phase. The fluid phase is brought to a higher pressure with a pump and transported to the storage site provided for it. The aggregate state, in which the acid-gas fraction at the head of the high-pressure regeneration column accumulates subsequent to the condenser, depends on several factors. Thus, a high pressure and a low temperature level favor the formation of a fluid phase. High cooling power of the condenser also has a favorable effect on the liquefaction of the acid-gas fraction. Likewise, the composition of the acid-gas fraction has an influence on the aggregate state. Thus, acid-gas fractions containing hydrogen sulfide can be liquefied significantly easier than, for example, those containing carbon dioxide.

If the acid-gas steam passing through the head can be condensed with conventional cooling media, the uncondensed gas stream is recycled into the absorption column. Preferably, the regeneration column is operated at a pressure that is higher than that of the absorption column, so that because of the decrease in pressure alone, the gas stream can be transported. If the pressure is insufficient, the required increase in pressure is implemented with the help of a compressor.

It has shown to be particularly favorable to recycle the uncondensed gases from the head products of the high-pressure stripping column and the high-pressure regeneration column by using a joint compressor with respect to the absorption column. This saves investment expense and operating costs.

The regenerated absorption agent is drawn off at the sump of the high-pressure regeneration column and recycled to the absorption column. If the acid gas contains primarily carbon dioxide and liquefaction cannot be achieved with the customarily available cooling agents (air cooling, water cooling), the acid-gas vapors leaving the condenser are brought to the required storage is pressure by using a compressor.

The absorption agent that is completely free of acid-gas components leaves the high-pressure regeneration column at the sump. The absorption agent leaving the high-pressure regeneration column is at a higher temperature level in contrast to the sump of the high-pressure stripping column. It has been shown to be energetically advantageous if the regenerated absorption agent that is drawn off at the sump of the high-pressure regeneration column transfers some of its heat to the boiler of the high-pressure stripping column. An additional transfer of heat can occur to the cold absorption agent that is leaving the absorption column by using heat exchangers.

If required, the absorption agent is cooled still further by a cooling system. The regenerated and cooled absorption agent goes back to the head of the absorption column with the aid of a pump.

BRIEF DESCRIPTION OF THE DRAWING

Additional characteristics and advantages of the invention result from the description of an illustrated embodiment with the aid of a drawing and from the drawing itself. This drawing is a system diagram of the method according to the invention.

DETAILED DESCRIPTION OF THE DRAWINGS

Raw gas 1, after having been cooled with a top gas 3 coming from the head of an absorption column 40, is precooled in a gas/gas heat exchanger 41 prior to entering the absorption column 40 so that the acid-gas components in the gas are removed by a regenerated absorption agent 16 that is fed to the head of the absorption column 40.

The purified top gas 3 is drawn off from the head of absorption column 40. The absorption agent 5 that is loaded with acid gases is drawn off at the sump of the absorption column 40, is preheated by a heat exchanger 42 in counter-flow with a hot, regenerated absorption agent 13, and is fed to the head of a high-pressure stripping column 43. In the high-pressure stripping column 43, the acid-gas components contained in the absorption agent stream 5 are separated from the likewise coabsorbed usable gases in the absorption column 40, so that the useable gases exit the high-pressure stripping column 43 at the head and the acid-gas components discharge from high-pressure stripping column 43 together with the absorption agent at the sump. The high-pressure stripping column 43 is a special design of a high pressure distillation column. At the sump of the high-pressure stripping column 43, stripping steam 8 is generated by a boiler 44. By setting the corresponding amount of the stripping steam 8 and a corresponding number of mass exchange elements 57 in the lower part of the high-pressure stripping column 43, the proportion of usable gases in mass flow 7 that leaves the high-pressure stripping column 43 at the sump is minimized. Simultaneously, mass exchange elements 56 that are in the upper part of high-pressure stripping column 43 and a corresponding adjustment of return flow 24 via condenser 45 ensure that in the high-pressure stripping column 43, the absorption agent present in the form of steam within mass exchange elements 56 is removed from the gas stream and thereby almost completely leaves high-pressure stripping column 43 at the sump. Mass flow 17 that is drawn off at the head of the high-pressure stripping column 43 contains useable gases and residuals of acid gases. This mass flow 17 is cooled in a condenser 45, and a part of the return stream is again applied to the head of the high-pressure stripping column 43. A stream 18 leaving the condenser 45 is recycled together with a mass stream 20 that originates from the absorption-agent regeneration by using a compressor 51, and after cooling in a cooler 52 is fed back again into the absorption column 40.

The mass stream 7 discharging from the high-pressure stripping column 43 at the sump is fed to the high-pressure regeneration column 47 by a pump 46, and acid gases that are still present in the absorption agent are separated. At the sump of the high-pressure regeneration column 47, stripping steam 11 is generated using a boiler 48 by evaporating some of the absorption agent, such that the stripping steam 11 drives the acid gases out of the absorption agent. The boiler 48 is operated with a heat-exchange medium 29. By adjusting the amount of the stripping steam 11, and by a corresponding number of mass exchange elements 58 in the lower part of the high-pressure regeneration column 47, an almost complete separation of the acid gases from the absorption agent is achieved. Mass exchange elements 59 installed in the upper part of high-pressure regeneration column 47 and the setting of a sufficiently high amount of return stream of head product 25 that is condensed in condenser 49 ensures that absorption agents present in the column steams are almost completely separated from the acid gases. Acid top gas 26 that accumulates in liquid form at the head of the high-pressure regeneration column 47 is drawn off at the condenser output. A liquid acid-gas fraction 26 is available after an increase in pressure by a pump 50 for reinjection into the storage site provided. An uncondensed gas stream 20 is recycled with a compressor 51 into the absorption column 40. At the sump of the high-pressure regeneration column 47, an almost pure absorption agent stream 10 accumulates that releases some of its heat to the boiler 44, and in the heat exchangers 53 and 42. After an increase in pressure by a pump 54, cooling takes place with the aid of a cooler 55, the heat being released to a cooler. The absorption agent is then recycled to the head of the absorption column 40.

The invention claimed is:

1. A method of removing acid gases from raw gas, the method comprising the steps of:

(a) supplying the raw gas to an absorption column having a head and a sump where the raw gas is contacted with a physical absorption agent, having a boiling point lower than 100° C. at atmospheric pressure, under elevated operating pressure at 5 to 150 bar to load the physical absorption agent with acid gases and usable gases and drive the physical absorption agent loaded with acid gases and usable gases from the absorption column at the sump while drawing off at the head of the absorption column a purified top gas containing up to a few ppm of acid-gas components;

(b) feeding the loaded physical absorption agent to a high-pressure stripping column operated at a pressure of 5 to 150 bar and having a head and a sump and at the head of the high-pressure stripping column driving out usable gases coabsorbed in the physical absorption agent with stripping steam to obtain head steams containing the usable gases and the physical absorption agent, and drawing off the driven out usable gases from the head steams at the head of the high-pressure stripping column, and to obtain at the sump physical absorption agent loaded with acid gases;

(c) liquefying the physical absorption agent contained in the head steams, and recycling the liquefied physical absorption agent contained in the head steams to the high-pressure stripping column;

(d) feeding the physical absorption agent leaving the sump of the high-pressure stripping column and still loaded with acid gases to a high-pressure regeneration column operated at a pressure of 5 to 100 bar and having a head and a sump;

(e) separating and drawing off acid gases at the head of the high-pressure regeneration column such that at least a portion of the acid gases accumulates at the head of the high-pressure regeneration column as a liquid; and (f) drawing off regenerated physical absorption agent at the sump of the high-pressure regeneration column and recycling regenerated physical absorption agent to the absorption column.

2. The method according to claim 1 wherein a physical absorption agent with a boiling point lower than 65° C. at atmospheric pressure is used.

3. The method according to claim 1, wherein a stripping steam is generated in the high-pressure regeneration column by evaporation of some of the physical absorption agent whereby the stripping steam drives acid gases out of the absorption agent.

4. The method according to claim 1 wherein at least some of the acid gases at the head of the high-pressure regeneration column accumulates as a fluid phase that is transported to a storage site by a pump.

5. The method according to claim 1 wherein the loaded physical absorption agent that leaves the absorption column at the sump is preheated in a heat exchanger with a hot, regenerated solution.

6. The method according to claim 1, wherein loaded physical absorption agent that leaves the absorption column at the sump is subject to a temperature increase of 50 to 250° C. before it is fed to the high-pressure stripping column.

7. The method according to claim 1 wherein uncondensed gases drawn off at the head of the high-pressure stripping column are recycled into the absorption column.

8. The method according to claim 1 wherein uncondensed gases from the head of the high-pressure regeneration column are recycled into the absorption column.

9. The method according to claim 7, wherein uncondensed gases from the head of the high-pressure stripping column and the high-pressure regeneration column are recycled to the absorption column using a common compressor.

10. The method according to claim 1, wherein regenerated physical absorption agent transfers some of its heat to a boiler forming part of the high-pressure stripping column.

11. The method according to claim 1, wherein stripping steam is generated by evaporation of some of the physical absorption agent.

12. The method according to claim 1, wherein an external stripping medium is supplied to the sump of the high-pressure stripping column.

13. The method according to claim 1, wherein an external stripping medium is supplied to the sump of the high-pressure regeneration column.

14. The method according to claim 2, wherein the physical absorption agent having a boiling point lower than 65° C. at atmospheric pressure is methanol.

15. The method according to claim 1, wherein according to step (b) the stripping steam used to drive out usable gases coabsorbed in the physical absorbent is itself evaporated physical absorbent.

16. The method according to claim 1, wherein according to steps (b) and (d) the high pressure generating column is operated at a higher pressure than the high pressure stripping column.

* * * * *

UNITED STATES PATENT AND TRADEMARK OFFICE
CERTIFICATE OF CORRECTION

PATENT NO. : 8,673,062 B2  
APPLICATION NO. : 13/132193  
DATED : March 18, 2014  
INVENTOR(S) : Johannes Menzel Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this

Twenty-ninth Day of September, 2015

Michelle K. Lee
*Director of the United States Patent and Trademark Office*